(12) United States Patent
Ding et al.

(10) Patent No.: US 7,474,968 B2
(45) Date of Patent: *Jan. 6, 2009

(54) CRITICAL FLOW BASED MASS FLOW VERIFIER

(75) Inventors: Junhua Ding, Tewksbury, MA (US); Kaveh Zarkar, Andover, MA (US); Ali Shajii, Canton, MA (US); Daniel Smith, North Andover, MA (US)

(73) Assignee: MKS Instruments, Inc., Wilmington, MA (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/479,092

(22) Filed: Jun. 30, 2006

(65) Prior Publication Data

US 2006/0283254 A1 Dec. 21, 2006

Related U.S. Application Data

(63) Continuation-in-part of application No. 11/090,120, filed on Mar. 25, 2005, now Pat. No. 7,174,263.

(51) Int. Cl.
*G01F 1/12* (2006.01)
*G01F 1/50* (2006.01)

(52) U.S. Cl. ............... 702/45; 702/100; 73/1.35; 73/1.36; 73/1.16; 73/204.22; 73/866.5

(58) Field of Classification Search ............ 702/45, 702/100; 73/1.35, 1.36, 1.16, 204.22, 866.5
See application file for complete search history.

(56) References Cited

U.S. PATENT DOCUMENTS 5,684,245 A * 11/1997 Hinkle ................. 73/1.35

6,955,072 B2 * 10/2005 Zarkar et al. ............... 73/1.36
2004/0261492 A1 12/2004 Zarkar et al.

(Continued)

FOREIGN PATENT DOCUMENTS

EP 0 890 828 A1 1/1999

OTHER PUBLICATIONS

International Search Report for related PCT/US2007/072186, dated Jan. 30, 2008 (4 pages).

(Continued)

*Primary Examiner*—Tung S Lau
*Assistant Examiner*—Sujoy K Kundu
(74) *Attorney, Agent, or Firm*—McDermott Will & Emery, LLP (57) ABSTRACT

A flow verifier for verifying measurement by a fluid delivery device under test (DUT) includes a chamber configured to receive a flow of the fluid from the DUT, at least one temperature sensor to provide gas temperature in the chamber, at least one pressure transducer to provide gas pressure in the chamber, and a critical flow nozzle located upstream of the chamber along a flow path of the fluid from the DUT to the chamber. The critical flow nozzle and the flow verification process are configured to maintain the flow rate of the fluid through the nozzle at the critical flow condition such that the flow rate through the nozzle is substantially constant and substantially insensitive to any variation in pressure within the chamber downstream of the nozzle. Therefore, the varying chamber pressure during the flow verification period has substantially no impact on the downstream pressure of the DUT, and the external volume between the flow verifier and the DUT is substantially irrelevant to the flow verification calculation.

14 Claims, 4 Drawing Sheets

U.S. PATENT DOCUMENTS

2006/0005882 A1 1/2006 Tison et al.
2006/0123921 A1 6/2006 Tison et al.

OTHER PUBLICATIONS

Written Opinion for related PCT/US2007/072186, dated Jan. 30, 2008 (8 pages).

MKS Instruments, Inc., Gas Box Rate-Of-Rise In Situ Flow Verifier the GBROR™, Bulletin GBROR-Aug. 1999, 6 pp.

MKS Instruments, Inc., Tru-Flow Mass Flow Verifier™ Model GBR3A, Bulletin Tru-Flo-May 2001, 4 pp.

* cited by examiner

CRITICAL FLOW BASED MASS FLOW VERIFIER

CROSS-REFERENCE TO RELATED APPLICATIONS

This application is a continuation-in-part application of: U.S. patent application Ser. No. 11/090,120 (the "'120 application") filed on Mar. 25, 2005, now U.S. Pat. No. 7,174,263, entitled "External Volume Insensitive Flow Verification." The contents of this application is incorporated herein by reference in its entirety as though fully set forth.

BACKGROUND

High-precision fluid delivery systems such as mass flow controllers (MFCs) and mass flow ratio controllers (FRCs) are very important in applications such of semiconductor wafer fabrications. In many instances, the accuracy of these fluid delivery systems need to be verified.

A rate-of-rise (ROR) flow verifier may be used to verify the accuracy of measurement systems such as MFCs or FRCs. A typical ROR flow verifier may include a chamber, a pressure transducer, a temperature sensor and two isolation valves, one upstream and one downstream. The valves may be closed during idle, and may open when a run is initiated, allowing flow of fluid from the device under test (DUT) such as a MFC or a FRC through the flow verifier. Once fluid flow has stabilized, the downstream valve may be closed, and as a result the pressure may rise in the chamber, and the raise in pressure may be measured as well the gas temperature. These measurements may be used to calculate the flow rate and thereby verify the performance of the DUT.

The rising pressure in the chamber of a ROR verifier may be a major disturbance to the verification process. Although the DUT may adjust its valve position to offset the downstream pressure (chamber pressure) disturbance in order to maintain the targeted flow set point, the flow fluctuation may occur and undermine the flow rate verification process. A mass flow verification system and method are needed that can avoid such a disturbance to the DUT.

The connecting flow path volume between the DUT and the ROR flow verifier is called the external volume. It needs to be determined in order to calculate the flow rate by the ROR flow verifier. However, the setup calibration process for determining external volumes is very time-consuming if there are many DUTs connected to the ROR verifier so that a different external volume results for each DUT. Furthermore, the accuracy of flow verification by a ROR decreases as the external volume increases. This is because the pressure drop along the flow path, i.e. the pressure change (measured by the pressure transducer) in the chamber of a ROR, is different from the pressure change along the flow path. The longer the flow path, the lesser the accuracy of flow verification. A mass flow verification system and method are needed in order to solve the external volume problem for the ROR verifier.

SUMMARY

An ROR verifier for verifying measurement by a fluid delivery device is described. The flow verifier includes a chamber configured to receive a flow of the fluid from the device, a temperature sensor configured to measure the gas temperature, and a pressure sensor configured to measure pressure of the fluid within the chamber. The flow verifier includes a critical flow nozzle located at the inlet of the chamber along a flow path of the fluid from the device under test (DUT) to the chamber. The critical flow nozzle is configured to maintain, during a critical flow time period $t_{cf}$, the flow rate of the fluid through the nozzle and the upstream pressure of the nozzle (the downstream pressure of the DUT) substantially constant, and substantially insensitive to variation in pressure within the chamber.

A method of minimizing the disturbance to the DUT by a ROR verifier during the verification process includes providing a critical flow nozzle between the flow delivery device and the mass flow verifier so as to maintain flow of the fluid across the nozzle so that flow rate of the fluid through the nozzle is substantially insensitive to variations in pressure within the chamber as long as ratio of downstream pressure of the nozzle and upstream pressure of the nozzle is less than a critical flow parameter $\alpha_{pc}$.

A ROR flow verification method for solving the external volume problem includes placing a critical flow nozzle at the inlet of the chamber of a ROR verifier such that the flow verification process is insensitive to external volumes and the information about external volumes is irrelevant to the flow verification calculation by the ROR verifier.

DETAILED DESCRIPTION

Figure 1:
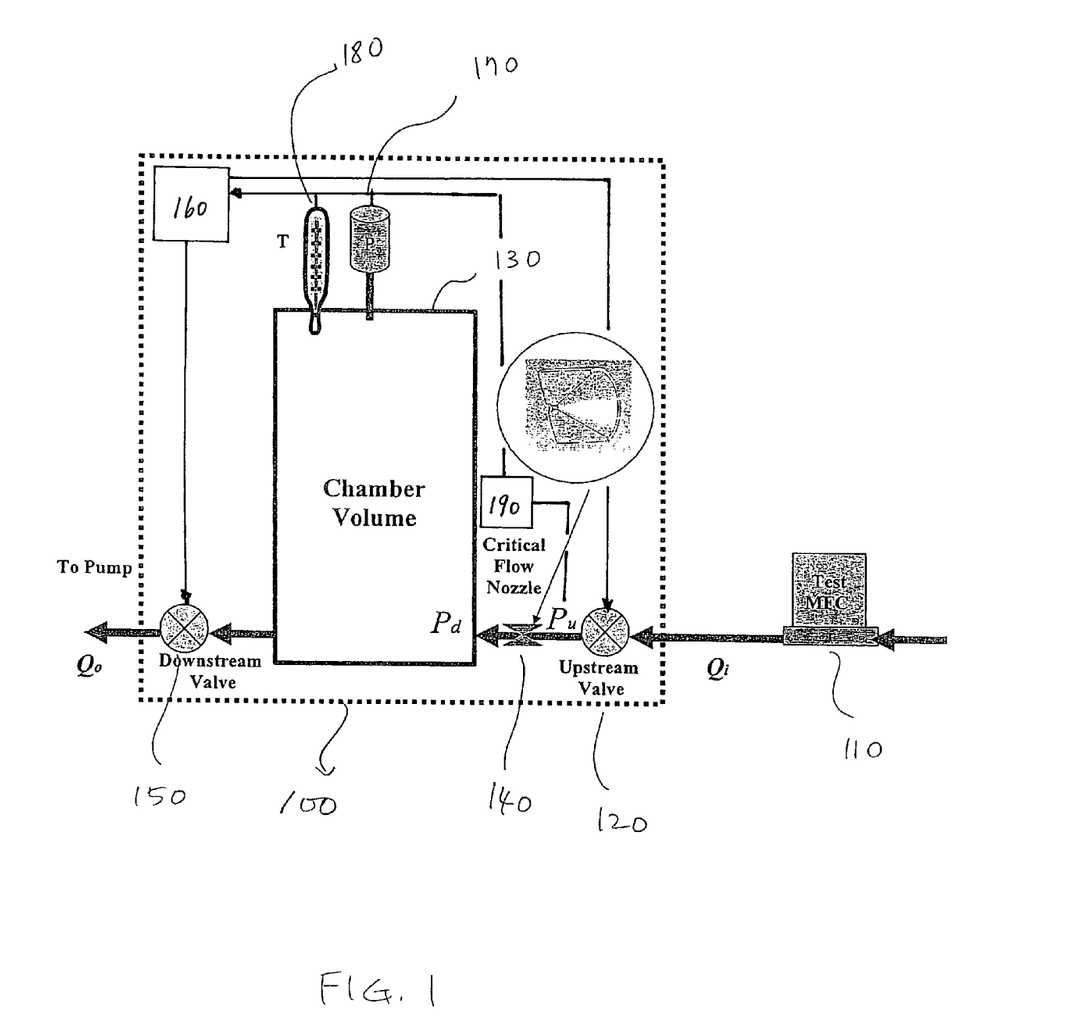
FIG. 1 is a block diagram of critical flow based mass flow verifier, in accordance with one embodiment of the present disclosure.

FIG. 1 is a block diagram of critical flow based mass flow verifier (MFV) 100, in accordance with one embodiment of the present disclosure. In the illustrated embodiment, the MFV 100 is a rate-of-rise (ROR) type of MFV in which the rate of rise of pressure of fluid flowing into an enclosed chamber is measured and used to verify the flow rate into the chamber. The MFV 100 is a critical flow based MFV that includes a flow restrictor 140, which may be a critical flow nozzle 140. While a critical flow nozzle 140 is described as a convergent nozzle for the illustrated embodiment described below, other embodiments of this disclosure may use other types of critical flow nozzles, such as a convergent-divergent critical flow nozzle, and may use any device including any type of critical flow restriction such as a critical flow orifice.

As described further below, the critical flow nozzle 140 maintains the flow through the nozzle 140 constant, so that the mass flow testing by the MFV 100 is substantially insensitive to the rising pressure within the chamber. The critical flow nozzle 140 thus greatly minimizes the downstream pressure disturbance to the device under test (DUT) such that the DUT has the minimum flow fluctuation during the flow verification process. The critical flow nozzle 140 also renders the mass flow verification by the MFV 100 substantially insensitive to any external volume between the critical flow nozzle 140 and the DUT.

The MFV 100 includes an enclosed volume or chamber 130 that is configured to receive a flow of a fluid from a DUT 110. The DUT 110 is typically a mass flow controller (MFC) or a mass flow ratio controller (FRC) that delivers the flow rate of the fluid. A downstream outlet valve 150 shuts on and off the flow of the fluid from the chamber 130. An upstream inlet valve 120 shuts on and off the flow of fluid from the DUT 110 into the chamber 130. The MFV 100 further includes a pressure sensor 170 configured to measure pressure of the fluid within the chamber 130, and a temperature sensor 180 configured to measure temperature of the fluid within the chamber 130. Typically, the fluid whose mass flow rate is being verified is a gas, although flow rates of other types of fluids may also be verified by the MFV 100.

The basic principle of a ROR MFV is a mass balance over the chamber 130. Using the mass balance equations, and applying the ideal gas law to the gas in the chamber, the inlet gas flow rate can be obtained by measuring the gas pressure and the gas temperature in the chamber of MFV according to the following equation:

$$Q_{in} = \frac{k_0 \cdot T_{stp} \cdot V_c}{P_{stp}} \frac{d}{dt}\left(\frac{P}{T}\right) \quad (1)$$

where $k_0$ is a conversion constant, $6\times10^7$ in SCCM (standard cubic centimeters per minute) units and $6\times10^4$ in SLM (standard liters per minute) units; $P_{stp}$ is the standard pressure (=1 atm), Tstp is the standard temperature (=273.15K), where P is the chamber gas pressure, $V_c$ the chamber volume, and T is the gas temperature.

The MFV 100 includes a controller 160 that receives the output signals of the pressure sensor 170 and temperature sensor 180 and controls the operation of the upstream valve 120 and the downstream valve 150. The controller 160 measures a rate of rise in pressure of the fluid within the chamber after the downstream valve is closed, and using the measured rate of rise of pressure over time and temperature to calculate the flow rate of the fluid from the DUT into the chamber according to Eq. (1), thereby verifying measurement by the DUT.

A typical mass flow verification procedure is as follows:
1. Open both the upstream valve 120 and the downstream valve 150;
2. Give a flow set point for the DUT;
3. Wait until the chamber pressure is at steady state;
4. Start to record the chamber gas pressure and the chamber gas temperature for flow calculation;
5. Shut the downstream valve 150 so that the chamber pressure rises;
6. Wait for a period for flow verification;
7. Open the downstream valve 150;
8. Stop recording the chamber gas pressure and the chamber gas temperature;
9. Calculate and report the verified flow based on Eq. (1).

The critical flow nozzle 140 is configured to maintain the flow of the fluid to a critical or choked flow. When a gas passes through a restriction, its density decreases and its velocity increases. There is a critical area at which the mass flux (the mass flow per unit area) is at a maximum. In this area, the velocity is sonic, and further decreasing the downstream pressure will not increase the mass flow. This is referred to as critical flow or chocked flow.

In order for the critical flow condition to be satisfied, a critical pressure ratio $\alpha_{pc}$ is defined as the ratio between the maximum allowable downstream pressure of the nozzle, $P_{dmax}$, to the upstream pressure of the nozzle $P_u$ as:

$$\alpha_{pc} = \frac{P_{d,max}}{P_u}. \quad (2)$$

The critical flow condition requires:

$$\frac{P_d}{P_u} \leq \alpha_{pc}, \quad (3)$$

where $P_d$ is the downstream pressure of the nozzle. The critical pressure ratio $\alpha_{pc}$ is a property of the flow restrictor, i.e. of the critical flow nozzle 140. The critical pressure ratio is only dependent on the geometry of the critical flow nozzle, and intrinsic gas properties. For ASME long-radius nozzles without diffuser and thick squared-edged orifices, the critical pressure ratio $\alpha_{pc}$ can be derived based on the assumption of steady isentropic flow as:

$$\alpha_{pc} = \left(\frac{2}{\gamma+1}\right)^{\frac{\gamma}{\gamma-1}} \quad (4)$$

where y the ratio of specific heat of the gas defined as:

$$\gamma = \frac{C_p}{C_v}, \quad (5)$$

where $C_p$ is the gas heat capacity at constant pressure, and $C_v$ is the gas heat capacity at constant volume.

Under the critical flow condition, the critical flow rate is given by:

$$Q = \frac{k_0 T_{stp}}{P_{stp}T} C' A P_u \left(\frac{RT}{M}\frac{2\gamma}{\gamma+1}\right)^{1/2}\left(\frac{2}{\gamma+1}\right)^{1/(\gamma-1)}, \quad (6)$$

where $k_0$ is the conversion factor described above, T the gas temperature, $P_u$ the upstream pressure, A the cross area of the orifice or the nozzle throat area, C' the discharge coefficient, M the molecular weight of the gas, R the universal gas law constant, and C' is the nozzle discharge coefficient.

The discharge coefficient C' accounts for the reduced cross-sectional area as the high speed gas stream continues to decrease in diameter, after it passes through the orifice. The value of C' is between 0.7 to 1.0.

The following gas function may be defined:

$$f_g(M, \gamma, T) = \left(\frac{RT}{M}\frac{2\gamma}{\gamma+1}\right)^{1/2}\left(\frac{2}{\gamma+1}\right)^{1/(\gamma-1)} \quad (7)$$

Using this definition of a gas function, Eq.(6) can be simply written as:

$$Q = \frac{k_0 T_{stp}}{P_{stp}} C' A \frac{f_g(M, \gamma, T)}{T} P_u. \quad (8)$$

As long as the critical flow condition of Eq.(3) maintains, the downstream pressure will not influence the mass flow rate across the restriction, and the only way to increase the flow rate is to increase the upstream pressure according to Eq. (8).

The critical flow based MFV (hereinafter referred to as the cMFV) has a flow restrictor such as a critical flow nozzle or orifice at the entrance of the chamber of a ROR verifier, as illustrated in FIG. 1. If both the upstream valve 120 and the downstream valve 150 of the cMFV 100 are open and the flow of the DUT is at steady state and the critical nozzle is properly sized, the pressure ratio between the downstream pressure of the restrictor (the chamber pressure) and the upstream pressure of the restrictor is less than the critical pressure ratio limit ($\alpha_{pc}$). Therefore the flow across the flow restrictor is a critical flow and independent of the chamber pressure according to Eq. (8). At this steady state moment, the flow through the restrictor is equal to the flow delivered by the DUT and the upstream pressure of the restrictor (the downstream pressure of the DUT) is constant. When the downstream valve 150 is shut for flow verification, the chamber pressure rises.

As long as the pressure ratio between the chamber pressure and the upstream pressure of the restrictor is less than the critical pressure ratio ($\alpha_{pc}$), the flow through the restrictor is still a critical flow and independent of the rising chamber pressure. Therefore, the flow through the restrictor is unchanged, the upstream pressure of the restrictor is unchanged, and there is no downstream pressure disturbance to the DUT even as the chamber pressure is increasing. If the increasing chamber pressure exceeds the critical pressure ratio ($\alpha_{pc}$), the flow through the restrictor is not a critical flow and it is dependent on both the upstream and the downstream pressure of the restrictor. As a result, the flow through the restrictor is not equal to the flow delivered by the DUT, the upstream pressure of the restrictor changes and there is a downstream pressure disturbance to the DUT.

The critical flow period of cMFV is defined as the period between the moment when the downstream valve is completely shut and the moment when the rising chamber pressure exceeds the critical pressure ratio limit ($\alpha_{pc}$). During the critical flow period, the flow through the restrictor is a constant critical flow and independent of the chamber pressure, and there is no downstream pressure disturbance to the DUT. The critical flow period can be obtained by integrating both sides of equation (8) with the help Eq. (1) and Eq. (3), from a time t=0, to the critical flow period $t_{cf}$:

$$t_{cf} = \frac{V_c(a_{pc} - a_{p0})}{C'Af_g \ (M, \gamma, T)} \quad (9)$$

where ($\alpha_{p0}$) is the initial pressure ratio between the chamber pressure and the upstream pressure of the restrictor at t=0 (at the moment when the inlet flow is stabilized before the downstream valve is shut).

As seen from equation (9), the critical flow period is only dependent on the gas properties, the gas temperature, and the geometry of the cMFV including the critical flow nozzle. In other words, the critical flow period is independent of flow rate. If the verification time of a cMFV is within the critical flow period, the flow across the nozzle is a constant critical flow and the rising chamber pressure does not disturb the downstream pressure of the DUT. This greatly minimizes the downstream disturbance to the DUT. The critical flow period is also proportional to the chamber volume $V_c$. Increasing the critical pressure ratio $\alpha_{pc}$, or decreasing the critical flow area A, therefore increases the critical flow period. For a given critical flow nozzle and a chamber volume, it is found that large molecular weight gases such as $SF_6$ and $WF_6$ have a much larger critical flow period than that of small molecular gases such as $H_e$ and $H_2$. Hydrogen has the smallest critical flow period in all semi-gases.

The flow restrictor such as a critical flow nozzle or orifice separates the chamber of a ROR verifier from the external plumbing to the DUT as long as the critical flow condition of Eq. (3) holds. If the flow verification period is within the critical period, the critical flow through the restrictor is equal to the flow rate of the DUT. Clearly, the external volume between the critical flow nozzle and the DUT is irrelevant to the flow calculation of Eq. (1). There is no need for setup calibration process to determine the external volume between the flow restrictor and the DUT for flow verification calculation.

Figure 2:
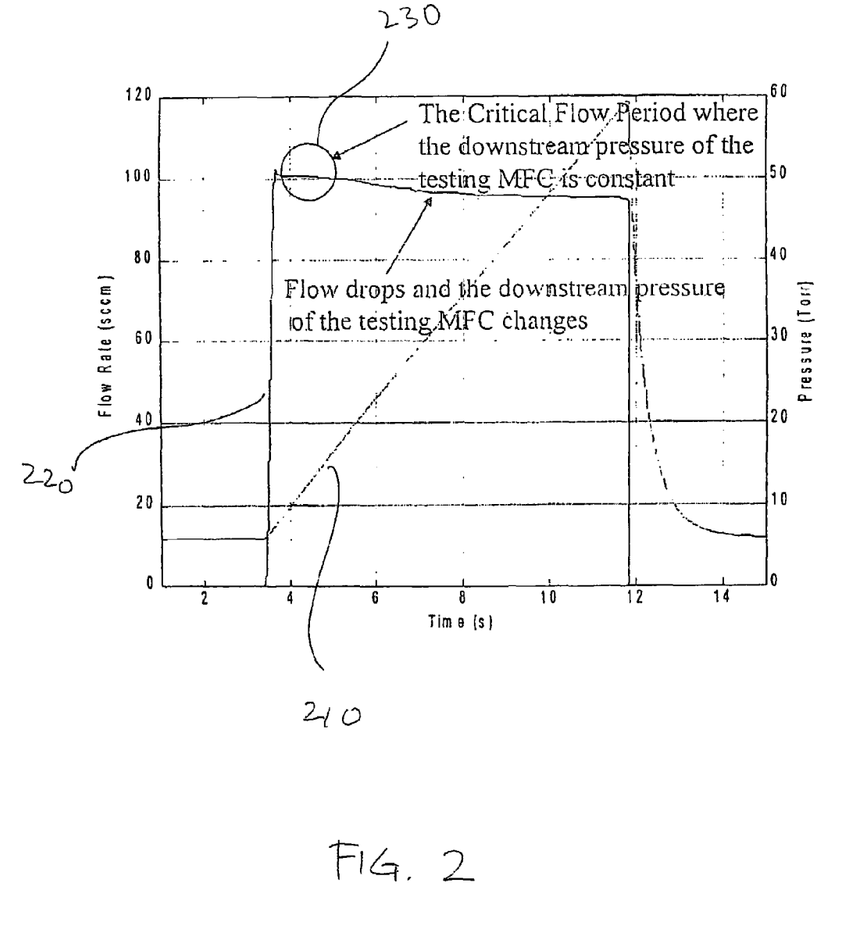
FIG. 2 is a graph illustrating the response of the critical flow based mass flow verifier shown in FIG. 1.

FIG. 2 is a graph illustrating the critical flow period, as well the response of the critical flow based MFV 100. The graph 210 represents the pressure of the fluid within the chamber, which rises when the downstream valve is closed. The graph 220 represents the flow rate of the fluid. The critical flow period of cMFV is indicated in FIG. 2 with reference numeral 230. As seen in FIG. 2, during the critical flow period, the inlet flow through the nozzle is a critical or choked flow, the rising chamber pressure will not affect the inlet flow and the upstream pressure of the nozzle (which is also the downstream pressure of the DUT). After the critical flow period (during which the downstream pressure of the DUT is constant) lapses, the flow rate drops, and the downstream pressure of the DUT changes.

If the chamber pressure can be kept always lower than the critical pressure ratio limit during the flow verification, the flow through the nozzle will always be at the critical flow condition and the varying chamber pressure will not disturb the downstream pressure of the DUT, which substantially minimizes the fluctuation of the actual flow of the DUT.

Figure 3:
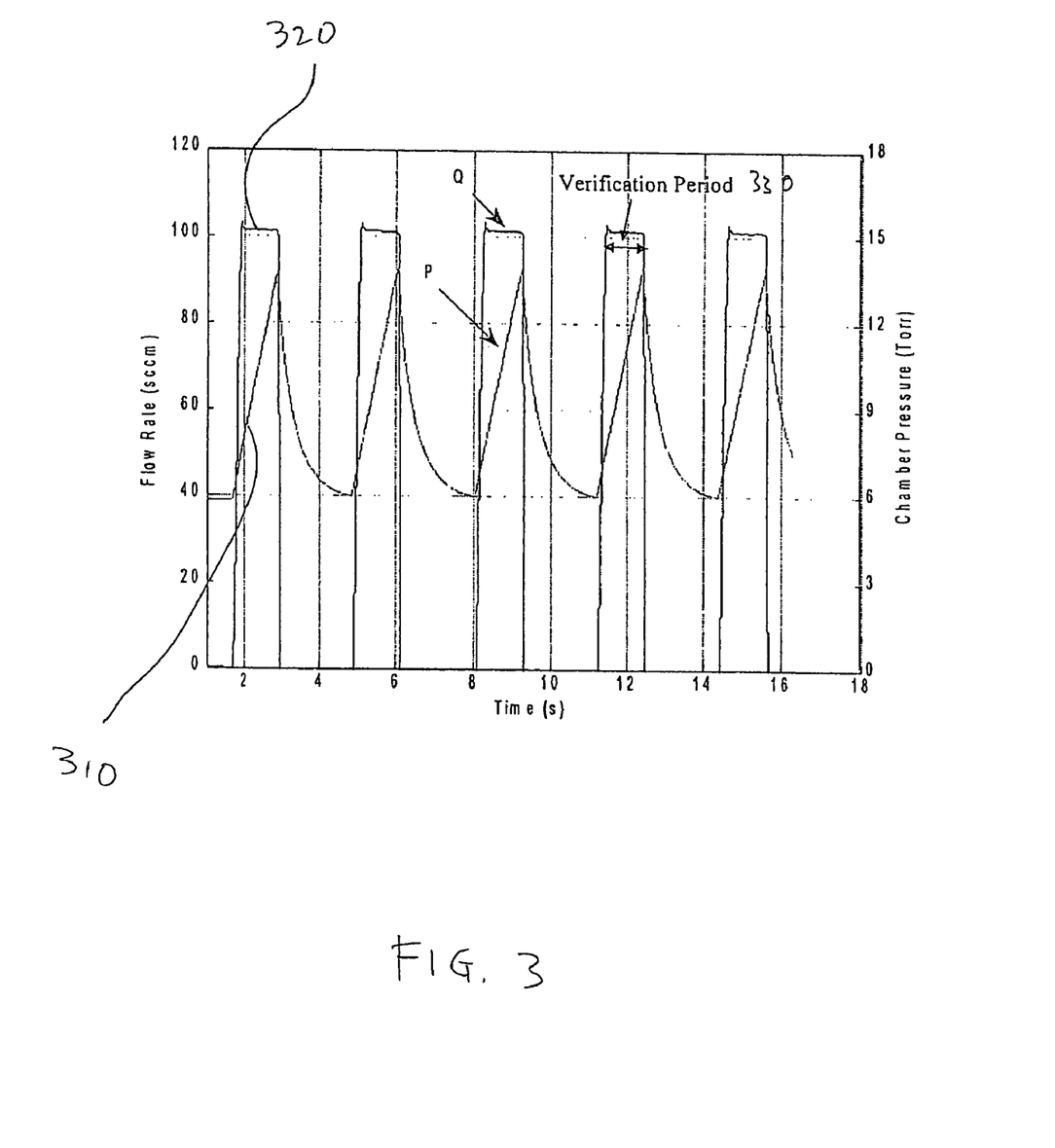
FIG. 3 illustrates a continuous pulse semi-real time operation of the critical flow based mass flow verifier shown in FIG. 1.

FIG. 3 illustrates a continuous pulse semi-real time (CPSR) operation of the critical flow based mass flow verifier shown in FIG. 1. The graph 310 represents the pressure of the fluid within the chamber, which rises when the downstream valve is closed and drops when the downstream valve is opened. The graph 320 represents the flow rate of the fluid. The CPSR operation has been developed for cMFV in order to continue to meet the critical flow condition during the entire multiple-run flow verification period. In the CPSR operation, the period between the downstream valve shut and open is within the critical flow period such that the rising chamber pressure never exceeds the critical pressure ratio limit. As seen in FIG. 3, each flow verification run is within the critical flow period such that the flow across the nozzle is a critical flow. Hence the varying chamber pressure has no impact on the upstream pressure of the nozzle, thus minimizing the downstream pressure disturbance to the DUT. As a result, the actual flow fluctuation of the DUT has been minimized for the whole multiple-run flow verification period.

The output of the verification can be averaged among these multiple runs in which the inlet flow across the nozzle is constant or at the critical flow condition, as guaranteed by the CPSR operation. In this way, the variance caused by the measurement noise can be minimized. The CPSR operation described in the previous paragraph is a simple and fast way to achieve multiple runs for flow verification without disturbing the downstream pressure of the DUT.

Figure 4:
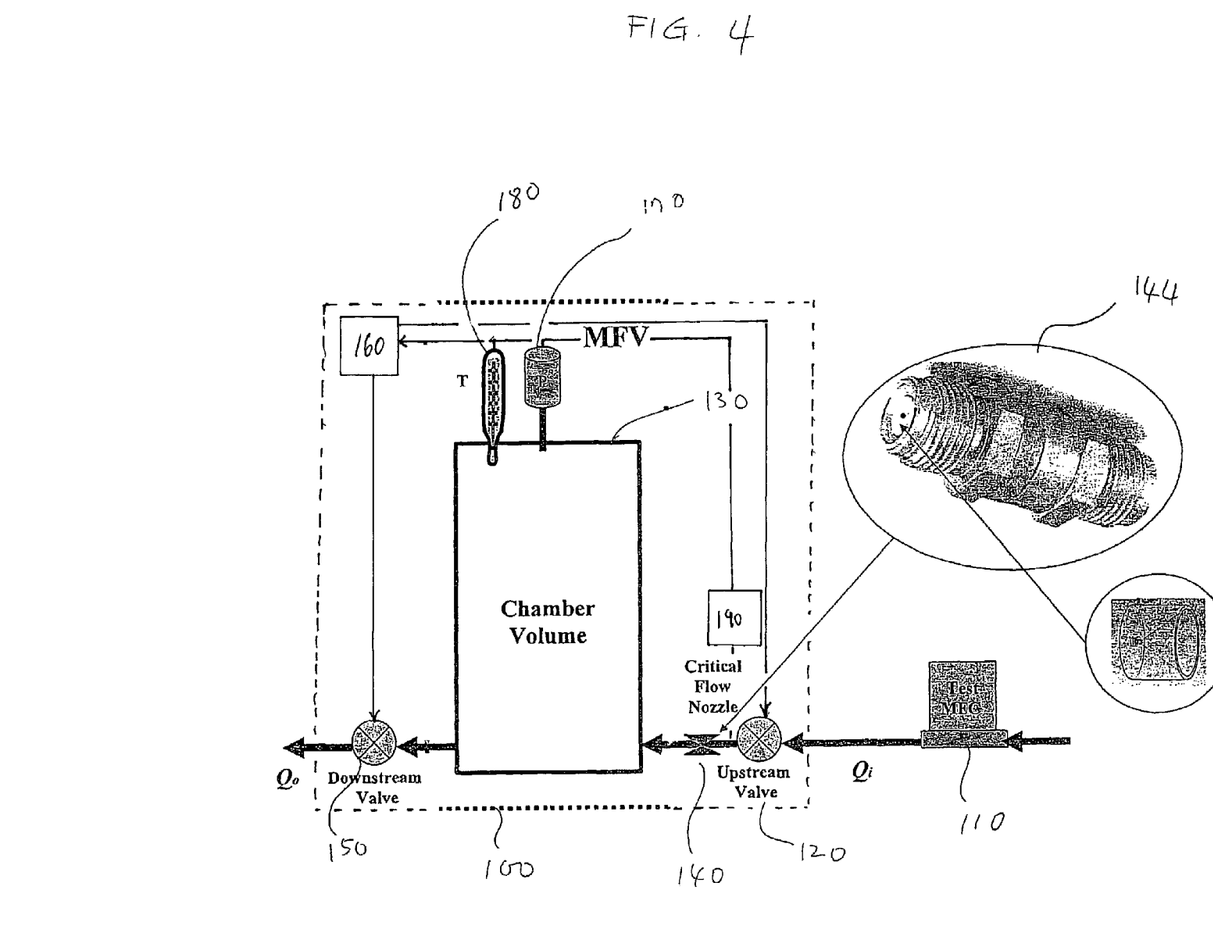
FIG. 4 schematically illustrates add-on critical flow nozzles for a mass flow verifier.

Critical flow nozzles are easy to be modeled, calculated, designed, manufactured and tested. The critical flow nozzle can be an add-on part to a ROR MFV. FIG. 4 schematically illustrates add-on critical flow nozzles for a ROR MFV. Different orifice sizes of the critical flow nozzle can be selected based on the flow range and the maximum downstream pressure requirement for the DUT in order to achieve excellent accuracy, repeatability, and external volume insensitivity properties for mass flow verification.

In one embodiment, the MFV 100 may further include a second pressure transducer 190 (shown for convenience in both FIGS. 1 and 4), located upstream of the flow nozzle, as a flow stability detector. The pressure transducer 190 is configured to measure the upstream pressure of the flow nozzle 140. Once the upstream pressure of the nozzle is stabilized, the flow through the nozzle into the chamber is stabilized, and the cMFV can immediately start the flow verification process. With the pressure transducer 190, the cMFV can avoid having to wait for a fixed period of time for flow to be stabilized before running the flow verification process. The upstream pressure of the nozzle can be further used to calculate the flow rate through the nozzle according to Eq. (6) as a second flow verification mechanism. This second flow verification mechanism can be used to diagnose the cMFV or as a second flow verification method to the cMFV.

In sum, a critical flow based MFV is presented in which a critical flow nozzle is placed at the entrance of the chamber volume. The critical flow nozzle can be an add-on part to a ROR MFV. As long as the ratio between the chamber pressure and the upstream pressure of the nozzle is less than the critical flow pressure ratio, the rising chamber pressure will not affect the downstream pressure of the DUT and the flow rate across the nozzle is constant. There is no need or setup configuration to determine the external volume between the DUT and the cMFV for flow verification. In this way, the performance of mass flow verifying in terms of accuracy, repeatability, and external volume insensitivity is substantially improved.

While certain embodiments have been described of systems and methods for, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A flow verifier for verifying measurement by a fluid delivery device, the flow verifier comprising:
    a chamber configured to receive a flow of the fluid from the device;
    a pressure sensor configured to measure pressure of the fluid within the chamber;
    a temperature sensor configured to measure temperature of the fluid within the chamber; and
    a critical flow nozzle located upstream of the chamber along a flow path of the fluid from the device to the chamber;
    wherein the critical flow nozzle is configured to maintain, during a critical flow time period $t_{cf}$, flow rate of the fluid through the nozzle substantially constant and substantially insensitive to variation in pressure within the chamber; wherein the critical flow nozzle is configured to allow the fluid flowing through the nozzle to satisfy a critical flow condition during the critical flow time period $t_{cf}$, and wherein the critical flow condition is given mathematically by:

$$\frac{P_d}{P_u} \le a_{pc} = \left(\frac{2}{\gamma+1}\right)^{\frac{\gamma}{\gamma-1}},$$

where
    $P_d$ is pressure of the fluid within the chamber and downstream of the critical flow nozzle, $P_u$ is pressure of the fluid upstream of the critical flow nozzle, $\gamma$ is given by $\gamma=C_p/C_v$ and is a ratio of specific heats $C_p$ and $C_v$ of the fluid, where $C_p$ is heat capacity of the fluid at constant pressure, and
    $C_v$ is heat capacity of the fluid at constant volume, and $\alpha_{pc}$ is critical pressure ratio representing the maximum allowable ratio between $P_d$ and $P_u$ for which flow of the fluid across the nozzle will remain substantially constant and substantially insensitive to any variation in pressure within the chamber.

2. The flow verifier of claim 1, further comprising an upstream valve configured to shut on and off flow of the fluid from the device into an inlet of the chamber, and a downstream valve configured to shut on and off flow of the fluid from an outlet of the chamber.

3. The flow verifier of claim 2, further comprising:
    a controller configured to control the downstream and upstream valves and the pressure and temperature sensors, the controller further configured to measure a rate of rise in pressure of the fluid within the chamber after the downstream valve is closed, and using the measured rate of rise to calculate the flow rate of the fluid from the device into the chamber, thereby verifying measurement by the fluid delivery device.

4. The flow verifier of claim 3, wherein the pressure sensor and the temperature sensor are configured to make measurements within the critical time period $t_c$, so that the flow verification process is substantially independent of the varying chamber pressure and the external volume between the verifier and the DUT.

5. The flow verifier of claim 2, wherein the critical flow time period $t_{cf}$ is defined between a point in time when the downstream valve is shut, to a point in time when a ratio between $P_d$ and $P_u$ exceeds the critical pressure ratio limit, $\alpha_{p0}$, as given by:

$$t_c = \frac{V_c(a_{pc} - a_{p0})}{C'Af_g(M, \gamma, T)},$$

where
    $V_c$ is chamber volume,
    $a_{p0}$ is initial pressure ratio between the upstream and the downstream of the nozzle at t=0,
    C' is discharge coefficient for the nozzle,
    A is cross-sectional area of the nozzle throat,
    $f_g(M, \gamma, T)$ $$f_g(M, \gamma, T) = \left(\frac{RT}{M}\frac{2\gamma}{\gamma+1}\right)^{1/2}\left(\frac{2}{\gamma+1}\right)^{1/(\gamma-1)}$$

where
M is the molecular weight of the fluid,
R is the universal gas constant,
T is the gas temperature, and
γ is a ratio of specific heats $C_p$ and $C_v$ of the fluid, $C_p$ being the gas heat capacity at constant pressure, and $C_v$ being the gas heat capacity at constant volume.

6. The flow verifier of claim 1, wherein flow rate of the fluid during the critical flow period $t_{cf}$ is given by:

$$Q = C'AP_\mu\left(\frac{RT}{M}\frac{2\gamma}{\gamma+1}\right)^{1/2}\left(\frac{2}{\gamma+1}\right)^{1/(\gamma-1)},$$

where T is a temperature of the fluid; A is a cross-sectional area of nozzle orifice, C' is a discharge coefficient, M is a molecular weight of the fluid, R is a universal gas law constant, and
$P_d$, $P_u$, and γ are defined as in claim 1.

7. The flow verifier of claim 3, wherein the controller is configured to verify the measurement of the fluid delivery device by:
a) opening the upstream valve and the downstream valve;
b) providing a flow set point for the device;
c) waiting until pressure within the chamber reaches a steady state and stabilizes;
d) start to record the chamber gas pressure and the chamber gas temperature for flow calculation;
e) shut the downstream valve, so that the pressure within the chamber rises;
f) wait for a period less than the critical flow period $t_{cf}$ for flow verification;
g) open the downstream valve within a critical time period as measured from when the downstream valve was shut; and
h) compute the flow rate of the fluid into the chamber using:

$$Q_{in} = \frac{k_0 \cdot T_{stp} \cdot V_c}{P_{stp}} \frac{d}{dt}\left(\frac{P}{T}\right)$$

where $V_c$ is the chamber volume,
$T_{stp}$ is about 273.15K,
$P_{stp}$ is about 1.01325e5 $P_a$,
$K_0$ is about $6\times10^7$ in SCCM units and $6\times10^4$ in SLM units
P is the chamber pressure measured by the pressure sensor/transducter
T is the gas temperature measured by the temperature sensor.

8. The flow verifier of claim 7 wherein the critical nozzle separates the chamber volume of the ROR verifier from external plumbing to the DUT, so that the external volume information is irrelevant to the flow rate calculation of the ROR mass flow verifier, and no setup calibration is needed to determine the external volume between the flow verifier and the DUT.

9. The flow verifier of claim 8, wherein the flow verifier is operable in a continuous-pulse-semi-real time (CPSR) operation mode in which the controller causes the pressure and temperature measurements to be made by the pressure sensor and the temperature sensor during each of a plurality of verification time periods, each verification time period starting when the downstream valve is shut, and ending when the downstream valve is opened before the critical flow period $t_{cf}$ lapses from the time the downstream valve was shut, such that the flow across the nozzle is always at the critical flow condition and the varying chamber pressure has substantially no impact on the flow rate and the downstream pressure of the DUT.

10. The flow verifier of claim 9, wherein the flow rate computed by the controller is an averaged flow rate for multiple runs in the CPSR mode, so that a variance in the computed flow rate caused by measurement noise in the pressure sensor and temperature sensor is minimized.

11. The flow verifier of claim 1, wherein the critical flow nozzle is configured so as to restrict flow of the fluid through the nozzle to a critical flow.

12. A method of verifying measurement of a flow delivery device, comprising: placing a critical flow nozzle along the flow path of the fluid between the mass flow verifier and the DUT to maintain flow of the fluid so that during a critical flow time period, flow of the fluid across the nozzle and pressure of the fluid upstream of the nozzle of the remains substantially constant and substantially insensitive to the rise of the pressure within the chamber;
causing the fluid to flow from the device into a chamber along a flow path, while an inlet and an outlet valve of the chamber is kept open;
allowing a flow rate of the fluid into the chamber and a pressure of the fluid within the chamber to reach a steady state;
closing a valve downstream of the chamber so that pressure of the fluid begins to rise within the chamber; and
making measurements of fluid pressure and fluid temperature within the critical flow time period to measure a rate of rise of pressure of the fluid within the chamber and using the measured rate of rise of pressure to compute the flow rate of the fluid along with the measurements of fluid temperature; wherein the critical flow nozzle is configured to restrict flow of the fluid across the nozzle so that a critical flow condition is satisfied during the critical flow time period, and wherein the critical flow condition is given mathematically by:

$$\frac{P_d}{P_u} \leq a_{pc} = \left(\frac{2}{\gamma+1}\right)^{\frac{\gamma}{\gamma-1}},$$

where
$P_d$ is pressure of the fluid within the chamber and downstream of the critical flow nozzle,
$P_u$ is pressure of the fluid upstream of the critical flow nozzle,
γ is given by $\gamma = C_p/C_v$ and is a ratio of specific heats $C_p$ and $C_v$ of the fluid, where $C_p$ is heat capacity of the fluid at constant pressure, and $C_v$ is heat capacity of the fluid at constant volume, and
$\alpha_{pc}$ is a critical flow parameter representing maximum allowable ratio between $P_d$ and $P_u$ for which flow of the fluid across the nozzle will remain substantially constant and substantially insensitive to any variation in pressure within the chamber.

13. The method of claim 12, wherein the flow rate of the fluid is computed using:

$$Q_{in} = \frac{k_0 \cdot T_{stp} \cdot V_c}{P_{stp}} \frac{d}{dt}\left(\frac{P}{T}\right)$$

where P and T are measured by the pressure sensor and the temperature sensor during the verification period which is within the critical flow period such that the varying chamber pressure has not impact on the downstream pressure of the DUT.

14. The method of claim 13,
wherein the pressure and temperature measurements are made during each of a plurality of verification time periods, each verification time period starting when the downstream valve is shut, and ending when the downstream valve is opened before the critical flow time period $t_{cf}$ lapses from the time the downstream valve was shut; and
wherein the computed flow rate is an averaged flow rate during multiple runs in the CPSR mode so that measured noise is minimized.

* * * * *